Dec. 26, 1961  J. G. H. LAVIOLETTE  3,014,339
OSCILLATION LIMITING DEVICE FOR HOROLOGICAL MOVEMENT
Filed March 16, 1955  5 Sheets-Sheet 1

Inventor
J. G. H. Laviolette

Inventor
J.G.H. Laviolette

Dec. 26, 1961   J. G. H. LAVIOLETTE   3,014,339
OSCILLATION LIMITING DEVICE FOR HOROLOGICAL MOVEMENT
Filed March 16, 1955   5 Sheets-Sheet 5

Inventor
J. G. H. Laviolette
By Harcourt Downing Diebold
Attys.

United States Patent Office 3,014,339
Patented Dec. 26, 1961

3,014,339
OSCILLATION-LIMITING DEVICE FOR HOROLOGICAL MOVEMENT
Jean Georges Henri Laviolette, Besancon, France, assignor to Lip S.A. d'Horlogerie, Besancon, France, a corporation of France
Filed Mar. 16, 1955, Ser. No. 494,729
Claims priority, application France Feb. 19, 1952
1 Claim. (Cl. 58—28)

This invention relates to a locking limiting device of the amplitudes of oscillations of electromagnetically actuated great amplitude oscillators in horological portable movement.

This application is a continuation-in-part of applicant's copending application Serial No. 300,591, filed July 24, 1952, now abandoned.

The object of the invention is to limit the amplitude of the oscillations of such oscillators to a predetermined value.

It is obvious that the said oscillators should in no circumstances, when affected by disturbances, such as, for example, sudden movements, shocks, etc., generally mainly causing an increase in the amplitude of the oscillations, exceed the admissible amplitude beyond which they would close at the improper time the contact maintaining the oscillations which would then immediately impart a new impulse in the same direction to the oscillators. This new impulse would cause the oscillator to traverse a fresh and large supplementary oscillation having for its effects: (a) a change in the frequency of the oscillation and consequently in the regulation of the horological movement due to the faults in the isochronism of the oscillatory system working in these conditions, (b) practical impossibility, found by experience as regards these oscillators, which have lost their basic frequency, of re-establishing it automatically. Outside intervention is therefore necessary, without which the changed frequency is maintained and the regulation of the movement is entirely fanciful.

The object of the invention is to provide in an electrically driven clockwork an electromagnetically actuated great amplitude oscillator combined with a locking limiting device whereby such drawbacks are removed.

Referring to the accompanying drawings illustrating the invention:

Figure 1:
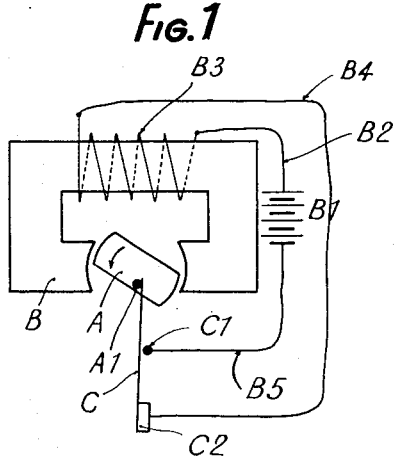
FIGURE 1 is a diagram illustrating the principle of the oscillator.

The diagrammatic FIGURE 1 illustrates the principle of the oscillator maintained electromagnetically and used in horological movements.

The great amplitude oscillator A, which consists of a pivoted soft iron member, and of a return helical spring (not shown in the drawing) constituting the "rotor," oscillates between the two poles of an electromagnet B constituting the "stator."

The maintenance of the oscillations controlled, as hereinafter explained, by the oscillator itself is ensured by an electric circuit comprising a battery B1, a conductor B2, a coil B3, a conductor B4, a contact C and a connecting conductor B5.

With each oscillation following the direction indicated by the arrow and referred to as "ascending" (the other one being "descending") the pin A1, which is integral with the oscillator A, comes into contact with the resilient contact blade C, secured at its end C2 to the frame of the movement, from which it is insulated, and by taking it along applies it against the fixed abutment C1, insulated from the frame, thereby closing the contact of the excitation circuit of the stator B. The stator becomes the seat of a magnetic field, one portion of which is transmitted to the oscillator or rotor A, which it magnetizes by induction; the rotor A then tends to place itself in the axis of the magnetic field comprised between the two poles of the stator, thereby accelerating the rotation of the oscillator A.

During this rotation the pin A1 leaves the contact blade C which, as it no longer abuts against C1, opens the circuit, thereby stopping the production of the magnetic field in the stator, and the rotor or oscillator then continuing to oscillate freely.

During the return or descending oscillation, no contact is established, as can easily be understood; in this case the oscillator does not receive any impulses except with each oscillation referred to as ascending. During the following ascending oscillation, the same cycle is recommenced and so on.

Figure 2:
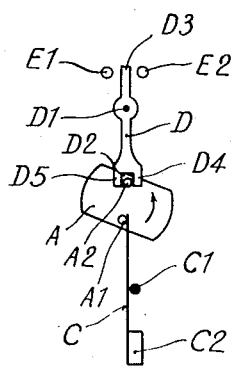
FIGURE 2 is a diagram showing the locking limiting device at rest.
Figure 3:
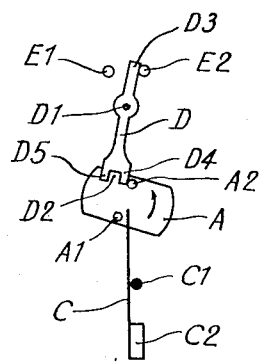
FIGURE 3 shows the limiting device as operated.

In the diagrammatic illustration by way of example of one form of the locking limiting device according to the invention which limits the amplitude of the oscillator, FIGURE 2 shows the oscillator in the position of equilibrium and FIGURE 3 shows it in the extreme position of the oscillation referred to as "ascending."

The construction according to the invention comprises a locking limiting device for example in form of a lever D shown pivoting at D1 entirely devoid of any other mechanical connections, and taken along alternately in the one or the other direction by the oscillator A, due to the pin A2 of the latter, co-operating with the notch D2 of the locking limiting device D, according as to whether the oscillation is in the one or the other direction, or, in other words, whether it is "ascending" or "descending."

The amplitude of the angular displacement of the locking limiting device D is limited by two fixed abutments E1 and E2 placed on the one and the other side of D, for the reasons hereinafter described.

When the oscillator shown in FIGURE 1 starts and traverses its ascending oscillation, it closes the electric excitation circuit of the stator, as indicated above; it receives an impulse and it continues its oscillation until the helical return spring has reached its maximum extension. At this moment it moves in the opposite direction, thus starting its descending oscillation; if, before returning, it receives for some accidental cause, an external impulse independent of the system tending to prolong its "ascending" oscillations, it will traverse an arc of a supplementary impulse, which would then be limited on the one side by the pin A2 of the oscillator abutting against the external wall D4 of the limiting device D, and on the other side by the fixed abutment E2, against which the limiting device D is blocked at D3, thus preventing the oscillator from following its oscillatory movement, the effect of which would be, as explained above, to close again the excitation contact at an inopportune moment, with the detrimental results above indicated.

The oscillator being stopped owing to this reason moves in the opposite direction, it starts its "descending" oscillation which leads it to a symmetrical position by passing through the point of equilibrium, where its pin A2 then engages in the notch D2 of D, it takes along the locking limiting device in the opposite direction, where then it can play the same symmetrical part if necessary, although in that case one does not fear that the excitation circuit will be closed, the latter not being able to close except with an "ascending" oscillation. Once the maximum contraction of the helical spring is attained, the oscillator starts moving in the opposite direction in its "ascending" oscillation, and so on.

Figure 4:
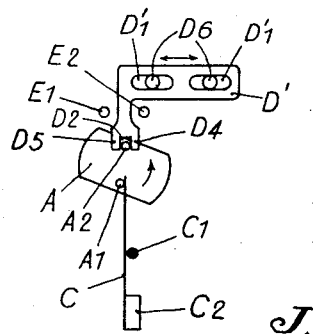
FIGURE 4 shows diagrammatically a modified embodiment of the locking limiting device.

FIGURE 4 shows alternatively another embodiment wherein the pivoting lever D is replaced by a sliding member D'. This member D' is mounted by means of two grooves D'1 engaging two pins D6 whereby it is guided during its sliding movement between the abutments E1 and E2.

Figure 5:
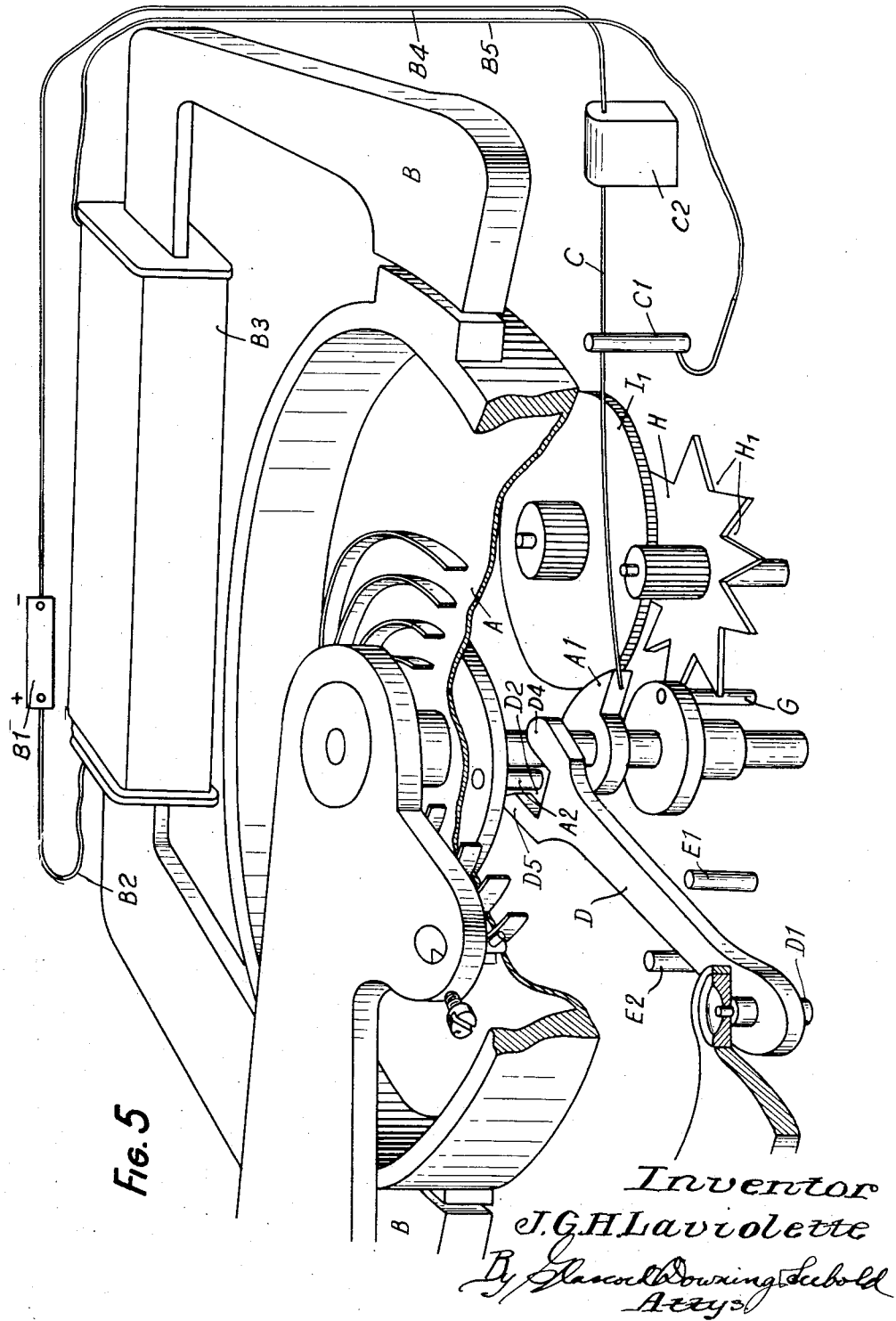
FIGURE 5 is a perspective view of one form of construction of the electromagnetic movement, together with the locking limiting device.
Figure 6:
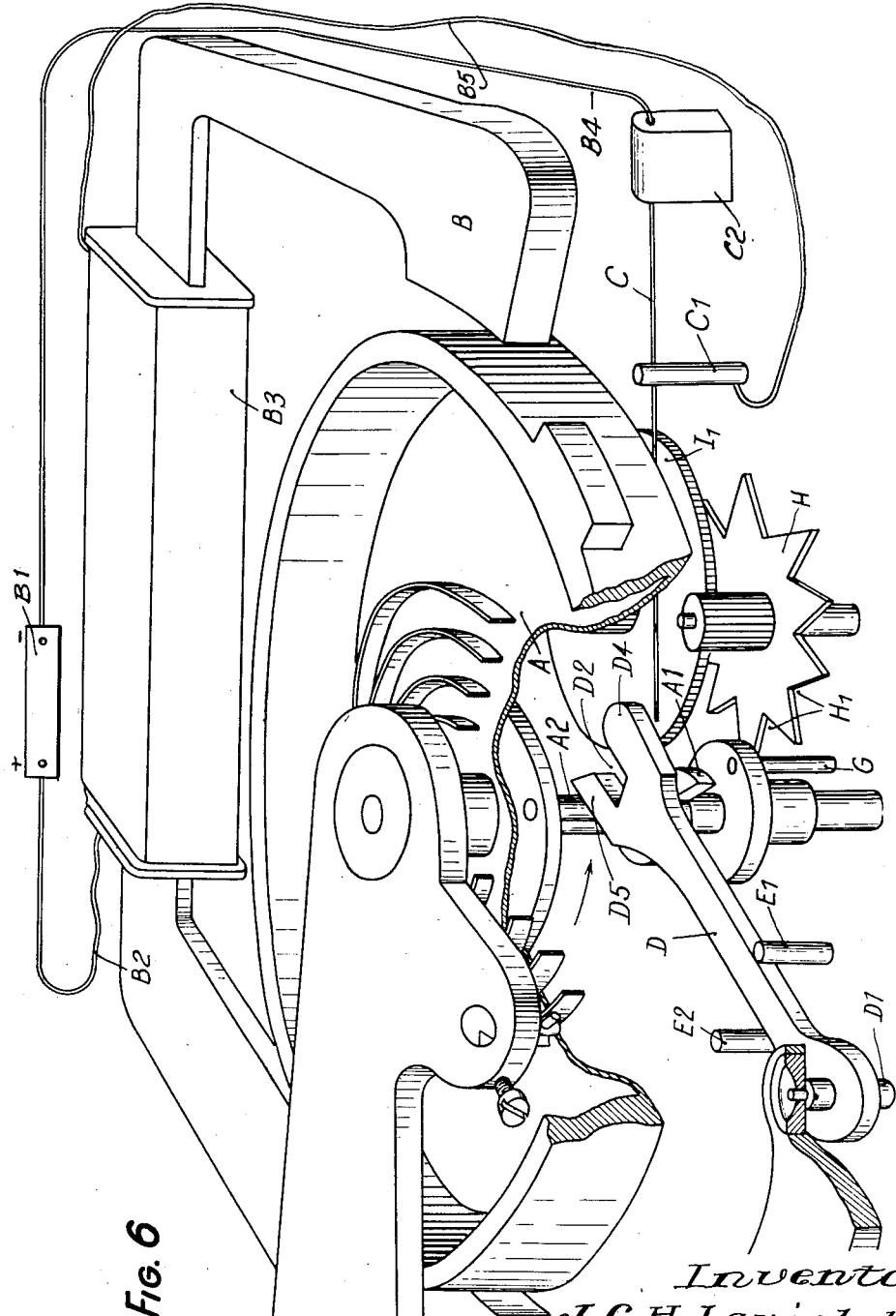
FIGURES 6 and 7 are perspective views of the movement and locking limiting device in operation.
Figure 7:
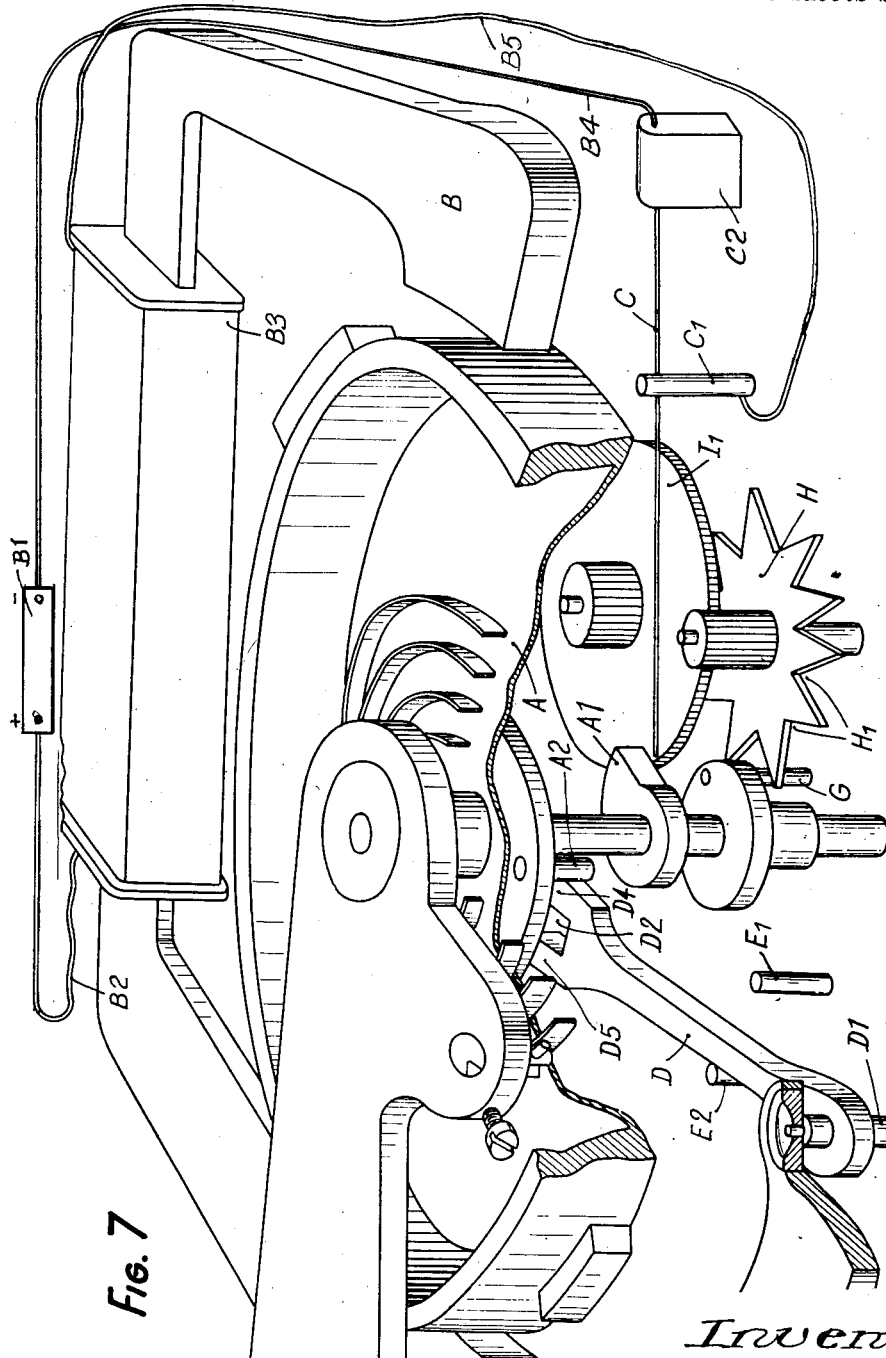
Figure 8:
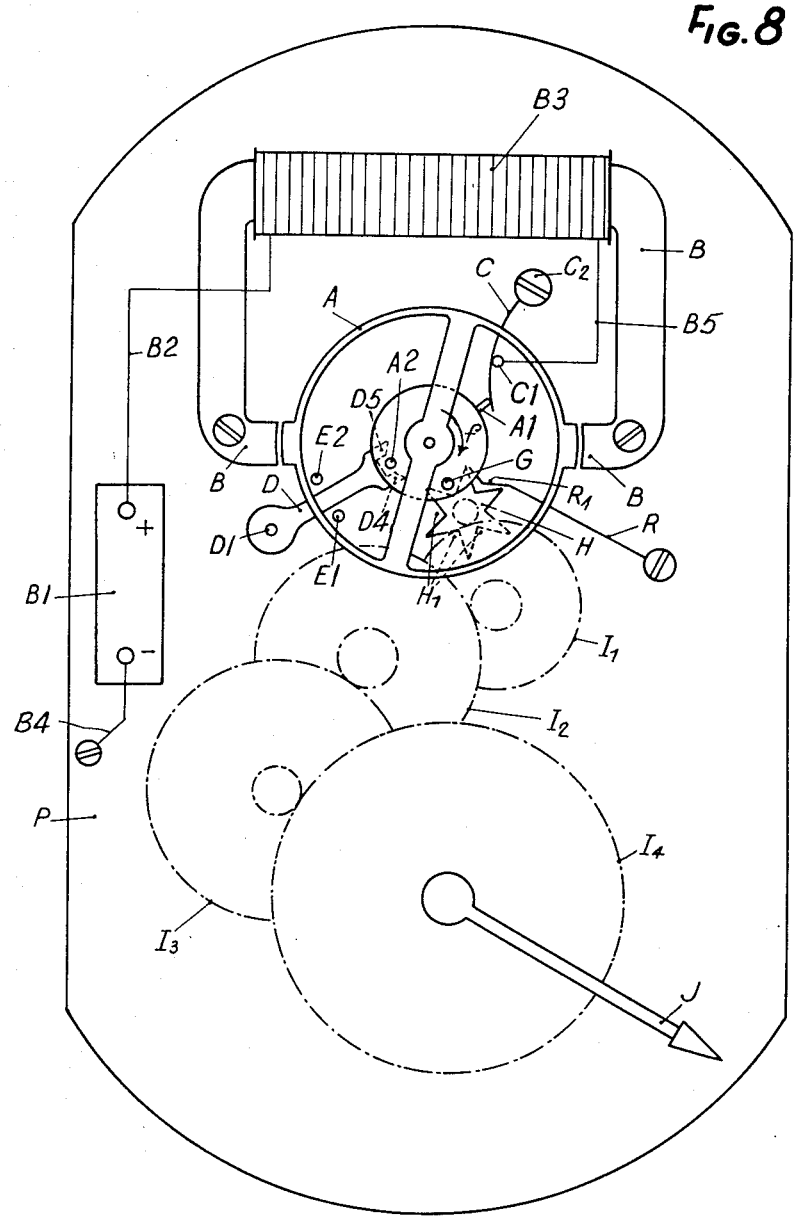
FIGURE 8 shows diagrammatically the essential parts of a clock embodying the invention.

FIGURES 5, 6 and 7 show the construction of a part of the movement comprising the locking limiting device and FIGURE 8 shows the essential parts of the clock wherein the said construction is provided for.

According to FIGURES 5 to 8, such an electric clock comprises for example a battery B1 connected by conductor B2 to coil B3 mounted on electromagnet B. Coil B3 is connected to fixed abutment C1 by conductor B5 while oscillator A during its oscillation causes resilient blade or wire C to make contact between C2 and C1 for closing the excitation circuit of stator B. FIG. 8 shows a supporting plate P carrying the elements of said construction.

In addition to the above-mentioned members or pins A1 and A2, oscillator A drives (FIGS. 5 to 7) or carries (FIG. 8) a member or pin G cooperating with a star wheel H which drives a train of toothed and intermeshing wheels $I_1$, $I_2$, $I_3$, $I_4$, the latter of which carries the hand J, said wheels $I_2$, $I_3$, $I_4$ and said hand J have been omitted in FIGS. 5 to 7 for the mere purpose of simplifying the drawing.

By the movement of oscillator A, pin G engages star wheel H and causes same to pivot in the direction of arrow $f$ (FIG. 8) during an ascending oscillation. During the return or descending oscillation, star wheel H is prevented from pivoting in the reverse direction due to a blade spring R (FIG. 8) provided with a folded end $R_1$ which engages in recesses $H_1$ of said star wheel H, or of another gear wheel integral with the latter.

It appears therefore that spring R co-operating with recesses $H_1$ of star wheel H together with the train of gear wheels $I_1$ to $I_4$, constitutes the means whereby the oscillations of normal amplitude of the rotor control the clockwork while the limiting device D prevents only the oscillations of excessive amplitude of rotor A to occur.

FIGURE 5 shows the oscillator A at rest in the position of equilibrium, the contact being closed and the pin A2 being free in the notch D2 of the limiting device D. The oscillator, maintained in oscillation alternately in the one or the other direction, takes along, also through the intermediary of the pin A2, the limiting device D, the movement of which is limited by the fixed abutments E1, E2. If for some reason, at the end of one of its oscillations, the oscillator receives a supplementary impulse, causing it to traverse an arc, also supplementary, it will not be able to exceed the amplitude fixed by the limiting device according to the invention (FIGURES 6 and 7 according to the direction of the oscillation), its pin A2 then abutting at D4 or D5 against the limiting device, which itself abuts against the fixed abutments E2 or E1, according to circumstances. The oscillator being then stopped, it returns under the action of the return spring, its oscillations then assuming a normal amplitude.

It will be seen (FIGURE 7) that it is impossible for the oscillator to close the contact at the end of the oscillation, because in no case will its projection A1 co-operate with the contact blade C.

The limiting device may either pivot or slide.

What I claim is:

In a horological device provided with a gearing for driving the clock hands, an electro-magnet including a stator provided with a gap, a rotor situated in said gap, a feeding electric circuit for energizing said electromagnet, a resilient contact arm in said circuit adapted to close and open it, a laterally extending stud means on said rotor adapted to contact said resilient contact arm to temporarily close the circuit and to open it upon a certain rotation of the said rotor, a helical spring situated on the shaft of said rotor and adapted to be wound and to store energy when the rotor is rotated in a certain direction and to restore it afterwards, a vertically extending stud on said rotor, an escapement wheel driven directly by said vertical stud for rotation in a certain direction, said escapement wheel driving in turn directly said gearing of the clock hands, a pawl device preventing said wheel from rotating in the opposite direction, a freely oscillating independent forked lever forming a separate security unit adapted to limit the over oscillation of said rotor, two stationary stops situated laterally with respect to said lever for limiting the oscillation thereof, a third vertical stud on said rotor engaging the fork of said forked lever to oscillate said lever during each oscillation of the rotor and to cause said lever to be stopped by one of said stationary stops at the end of each oscillation, whereas the said stud escapes from the said fork as soon as the amplitude of oscillation of the rotor accidentally exceeds the normal value, said stud being thereupon stopped by the impact on the outer part of said fork which itself is in abutment against one of said stationary stops.

References Cited in the file of this patent
UNITED STATES PATENTS

| | | |
|---|---|---|
| 1,585,079 | Butticaz | May 18, 1926 |
| 1,964,857 | Neumann | July 3, 1934 |
| 2,371,387 | Fink | Mar. 13, 1945 |
| 2,420,827 | Kennedy | May 20, 1947 |